United States Patent [19]

Ayral et al.

[11] Patent Number: 5,034,627
[45] Date of Patent: Jul. 23, 1991

[54] POWER LASER GENERATOR WITH CONTROL OF THE DIRECTION OF EMISSION OF THE OUTPUT BEAM

[75] Inventors: Jean-Luc Ayral; Jean Pierre Huignard, both of Paris, France

[73] Assignee: Thomson-CSF, Puteaux, France

[21] Appl. No.: 493,305

[22] Filed: Mar. 14, 1990

[30] Foreign Application Priority Data

Mar. 31, 1989 [FR] France ................. 89 04258

[51] Int. Cl.⁵ .............................. H01S 3/108
[52] U.S. Cl. ........................ 307/426; 372/3; 372/21; 372/24; 372/99; 372/107; 372/108
[58] Field of Search ................ 372/3, 19, 21, 24, 99, 372/107, 108, 13; 350/358; 307/424, 426, 428

[56] References Cited

U.S. PATENT DOCUMENTS

| | | | |
|---|---|---|---|
| 3,992,682 | 11/1976 | White et al. | 372/24 |
| 4,493,085 | 1/1985 | Valley | 372/19 |
| 4,527,866 | 7/1985 | Bowman et al. | 350/358 |
| 4,573,157 | 2/1986 | O'Meara | 372/19 |
| 4,682,340 | 7/1987 | Dave et al. | 372/108 |
| 4,734,911 | 3/1988 | Bruesselbach | 372/21 |
| 4,831,333 | 5/1989 | Welch | 330/4.3 |

FOREIGN PATENT DOCUMENTS 0292353  5/1988  European Pat. Off. .
8304145 11/1983  World Int. Prop. O. .

Primary Examiner—Frank Gonzalez
Assistant Examiner—Galen J. Hansen
Attorney, Agent, or Firm—Oblon, Spivak, McClelland, Maier & Neustadt

[57] ABSTRACT

This invention relates to power laser generators in which it is possible to control the angular direction of output laser beams. The generator according to the present invention is characterized by the fact that it successively comprises on the same optical axis of propagation, a pilot laser beam generator to generate a laser beam wavelength, a controllable deflector, a beam separator, a laser amplifying medium with the wavelength of the pilot beam, and a phase conjugation nonlinear mirror. The laser generator is applicable, in particular, to missile guidance systems or in telemetry systems.

10 Claims, 1 Drawing Sheet

POWER LASER GENERATOR WITH CONTROL OF THE DIRECTION OF EMISSION OF THE OUTPUT BEAM

BACKGROUND OF THE INVENTION

1. Field of the Invention

This invention relates to the power laser generators in which it is possible to control the angular direction of the output beams.

2. Discussion of the Background

In many fields, for example, telemetry and missile guidance, a laser beam, whose space-time coherence makes it possible to define a "small and immaterial line" over a relatively long path, is used most often as a reference element.

For terrestrial missile guidance over short distances, for example, a "helium-neon" type laser generator of several milliwatts of power is used. The beam defined by this type of generator is fine enough to be used as a reference for guiding or telemetering. Moreover, the laser generator is small and compact enough to easily, make possible the orientation, along a given direction, of its output beam. For this purpose, it is sufficient to mount the laser generator on a plate and to move this plate, by motors, along two or three axes. However, this use gives the desired result, only if the necessary angular displacement velocity is not very great.

In particular, for terrestrial guidance of missiles having to more relatively quickly, deflection cells have been made which are placed on the laser beam itself, at the output of the laser generator, and controlled electrically as are, for example, the acoustooptical static deflectors well known to one skilled in the art. The advantage of these deflectors is that they very quickly respond to the deflection orders which are given to them. On the other hand, they exhibit a major drawback namely, that of being able to only deflect low-power laser beams. Actually, in the case of the deflection of power beams, the deflectors are deteriorated very quickly by these beams themselves and their effectiveness decreases significantly when the given deflection angle increases, i.e. the power of the deflected beam diminishes as a function of the increase of the deflection angle.

SUMMARY OF THE INVENTION

This invention has as its object to make a power laser generator which can emit a laser beam whose angular output direction relative to the generator itself can vary in a large angular field, while keeping the qualities, in particular space and time, of the laser beams emitted by generators known in the prior art.

More precisely, this invention has as its object a power laser generator with control of the direction of emission of the output beam, characterized by the fact that is successively comprises on the same optical axis of propagation of the beam:

- means to emit a pilot laser beam of a given wavelength,
- a controllable deflector,
- a beam separator,
- a laser amplifying medium with the wavelength of the pilot beam, and
- a phase conjugation nonlinear mirror.

BRIEF DESCRIPTION OF THE DRAWINGS

Other characteristics and advantages of this invention will come out during the following description given with regard to the accompanying drawings by way of illustration but not at all limiting, in which FIGS. 1 to 3 very diagrammatically show various embodiments of a laser generator according to the invention.

DESCRIPTION OF THE PREFERRED EMBODIMENTS

Figure 1:
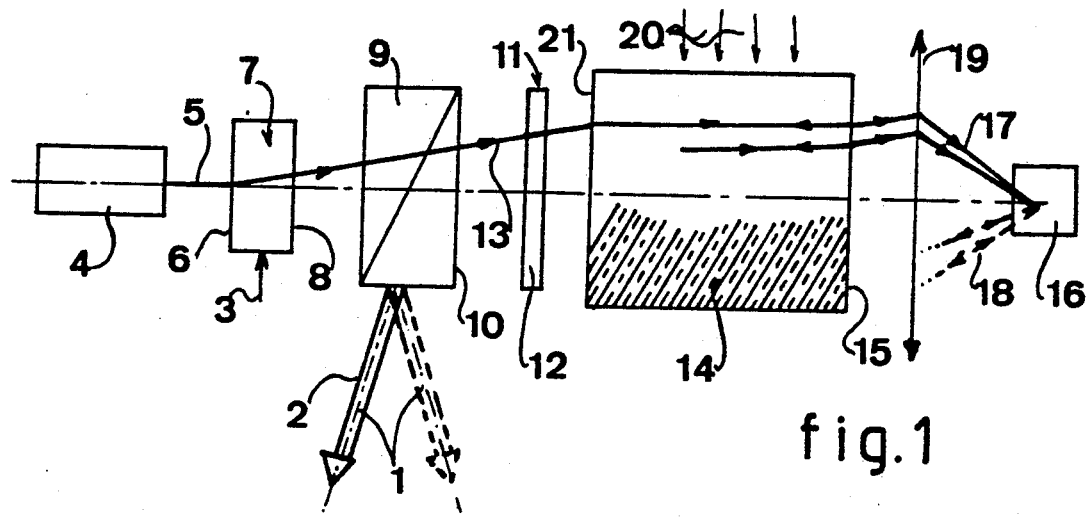
FIG. 1 shows a first embodiment of a power laser generator whose direction of emission 1 of output beam 2 is controlled as a function of a control order applied to a control input 3.

This generator comprises means 4 to emit a pilot laser beam 5 of low power but of high quality in the particulars, of aiming, of mode of oscillation and of stability. These means 4 consist, for example, of an oscillating laser generator with a Q-switch of the Fabry-Perot type.

This pilot laser beam 5 emitted by generator 4 falls on input window 6 of a deflector 7 of the acoustooptical type, for example, such as a $TeO_2$ or $LiNbO_3$ Bragg cell. Such elements are known in the art and will not be further described here. After having gone through deflector 7 and emerging through its output window 8, pilot laser beam 5 goes through a separator 9, for example, of the polarization type. In this case, a polarizer 11, for example, a quarter-wave plate 12, is placed on the optical path of the pilot laser beam at output 10 of separator 9.

Laser beam 13 obtained at the output of this polarizer 11 is then sent into a laser amplifying medium 14 suited to its wavelength. Output 15 of this amplifying medium is coupled with a mirror 16 consisting, according to a characteristic of the invention, of a nonlinear medium whose function is to conjugate in phase incident wave 17 coming from laser amplifying medium 14 with reflected wave 18, so that if the incident wave comprises phase distortions, this mirror, called "conjugate", returns a reflected wave comprising phase distortions identical to those of the incident wave, contrary to "standard" mirrors which return a reflected wave comprising opposite distortions.

Now, during a passage in amplifying medium 14, the wave undergoes phase distortions due, for example, to the well-known effect of a thermal lens connected to pumping beams 20 performed in this amplifying medium. Thus, in general, the rays of the beam located at the center "lag" relative to those of the periphery and relative to the direction of the movement of the wave.

With conjugate mirror 16 returning the beam with such a characteristic as defined above, the rays which "lagged" are, before undertaking the second passage in amplifying medium 14, "ahead" of the same amplitude relative to the direction of movement of this reflected wave. The second passage then makes it possible to compensate for the distortion due to the first passage and to restore the phase quality of the initial wave, while amplifying the power of the beam.

In the example illustrated, coupling means 19 of output face 15 of amplifying medium 14 with conjugate mirror 16 consist of a focusing lens.

Conjugate mirror 16 consists of a nonlinear medium perfectly suited to create a conjugate wave which can compensate, in particular, the phase distortions of the incident wave. These media are, for example, a gas such as methane ($CH_4$), sulfur hexafluoride ($SF_6$), etc., in which the stimulated Brillouin effect is developed, or electrooptical crystals such as gallium arsenide (GaAs), in which the photorefractive effect is developed.

It should be noted, however, that among the materials for nonlinear media, those producing a stimulated Brillouin effect advantageously are suited for obtaining a compensation of the phase distortions of the amplified laser beams which operate in pulses with high peak powers, for example, from 200 to 500 mJ for pulses of 10 ns.

The laser generator whose structure was just described with regard to FIG. 1 operates as follows:

Pilot laser generator 4 delivers a laser beam 5 of low power and high quality. This pilot laser beam 5 is deflected as a function of the control signal applied to input 3 of deflector 7, according to the angular direction desired. This deflection occurs according to a principle known in the art and its control is assured by that of the frequency of the ultrahigh-frequency signal applied, in particular to the crystal which constitutes the essential element of deflector 7.

The beam thus deflected freely goes through separator 9 which acts, for the wave of this incident beam, practically as a plate with parallel faces transmitting almost the entire beam. Then, it goes through quarter-wave plate 12 a first time. It then is amplified by a first passage in amplifying medium 14 and by a second passage in the opposite direction, after reflection on conjugate mirror 16 which makes possible, as explained above, the correction of the distortions due to the amplification.

The laser beam then goes through quarter-wave plate 12 a second time before penetrating separator 9 again. As the beam goes through the quarter-wave plate twice, during the first passage, it is polarized circularly, then, during the second passage, rectilinearly at 90 degrees from the incident wave. Separator 9, in particular by discrimination of the polarization, thus can completely deflect a high-power laser beam 2 to the output of the generator, by preventing the beam from falling on controllable deflector 7, which prevents its damaging or deterioration.

The angular deflection imposed by deflector 7 on low-power incident beam 5 and existing at the input of amplifying medium 14 is again identical to the output of separator 9, this condition being demonstrated very easily with the geometric construction of the propagation of beams in the various media.

Figure 2:
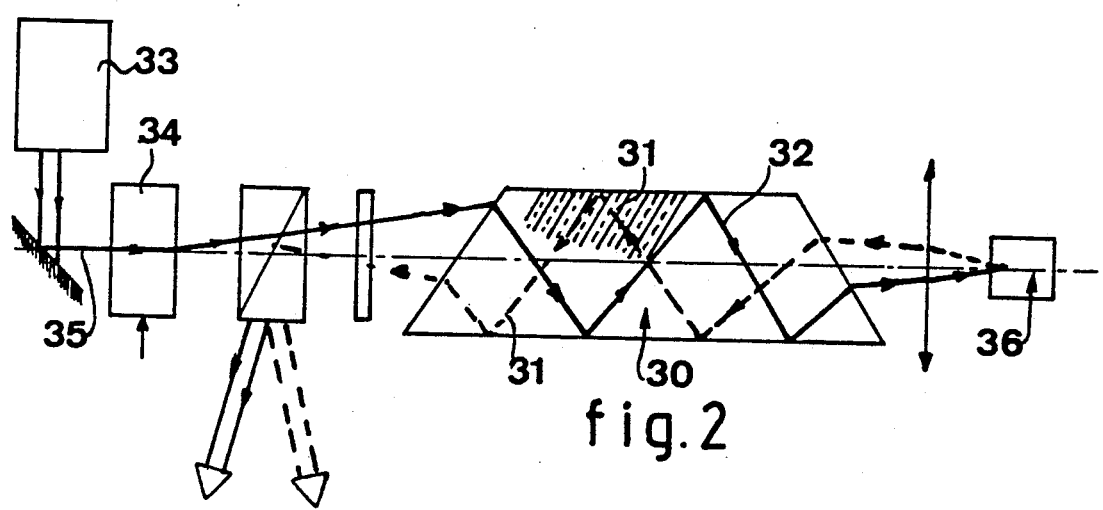

FIG. 2 shows a second embodiment of a laser generator according to the present invention which, in its principle, is identical to that according to FIG. 1, but in which laser amplifying medium 30 is of the "Slab" type assuring, after multiple reflections 31 of beam 32, a very good homogeneity of the gain in the amplification of the beam.

This type of generator is particularly suited for solid laser amplifying media, for example the bars or plates of neodymium or of the YAG (yttrium aluminum garnet) type, these configurations being compatible in particular with a multipassage of an incident wave of a wavelength close to 1.06 micrometers.

With such a laser generator as illustrated in FIG. 2, the applicant made a prototype in which pilot laser 33 is a laser pumped with diodes of an energy of 2 mJ for pulse durations of 10 ns with a repetition rate equal to about 10 Hertz.

Acoustooptical deflector 34 is a $TeO_2$ or $LiNbO_3$ Bragg cell which has a resolution of $10^3$ points, with an angular deflection of ±30° for a diameter of laser beam 35 on the order of 1 mm, or of ±3° for a beam diameter on the order of 10 mm, the effectiveness of the deflection easily reaching more than 50%.

Amplifying medium 30 is an Nd-YAG pumped optically by a flash bulb or by a network of semiconducting lasers, the gain being, in the established prototype, 20 db and making it possible to obtain an output energy equal to 200 mJ after two passages of the laser beam.

Conjugate mirror 36 consists of a $CH_4$ Brillouin cell, self-pumped and under reflection conditions optimized at a wavelength equal to 1.06 micrometers, the $CH_4$ gas being at a pressure of 100 bars and the reflectivity coefficient then being greater than 80%.

Figure 3:
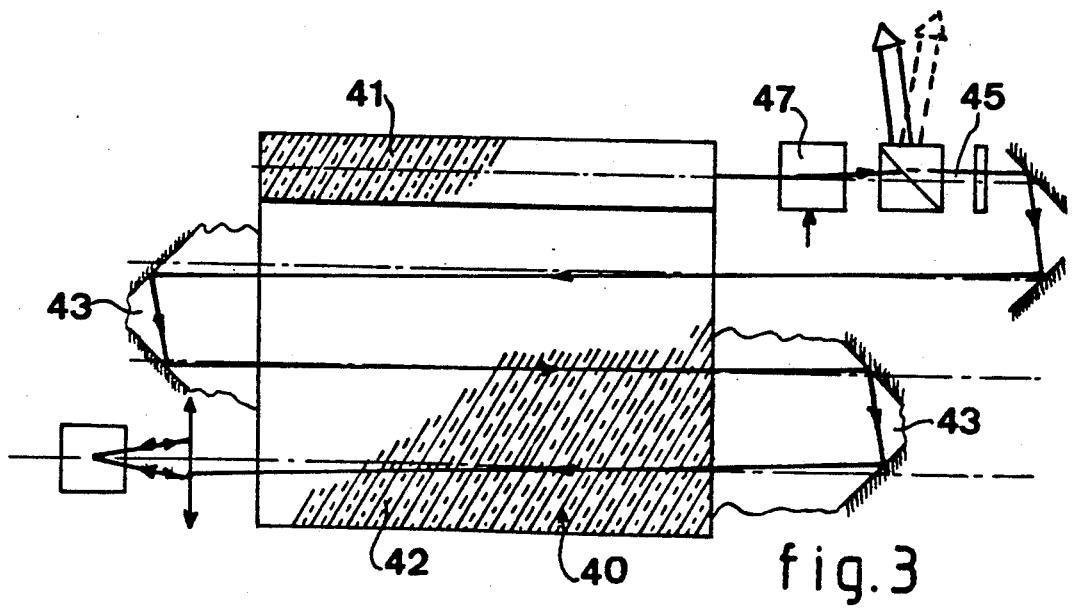

FIG. 3 shows a third embodiment of a laser generator according to the present invention, identical, in its basic principle, with the two embodiments described above, but in which laser amplifying medium 40 consists of a second part 42 of a "laser plate" whose first part 41 constitutes the pilot laser generator itself, for example an Nd-YAG. In that case, the laser plate is of a relatively large section and the amplification is obtained by a multipassage, in second part 42, of the beam deflected by deflector 47, this multipassage being achieved by the multiple reflections on mirrors 43, or total reflection prisms, outside of the laser plate.

In the embodiment illustrated, second part 42 of laser plate 40 is passed through six times by the part of deflected pilot laser beam 45. One of the advantages of this configuration is that it makes it possible to obtain, with a relatively short laser plate, a very long amplifying medium, for example of a triple length for the embodiment illustrated in FIG. 3.

These three structures for a laser generator according to the invention make it possible to obtain a self-correction of the phase distortions induced in any large-gain amplifying medium, in particular by the effect of a thermal lens. The conjugate wave is generated in an exacting way in the same direction as the incident wave, even for an angular deflection equal to ±30°. The angular deflection of the low-energy pilot beam is transferred to the power beam, and the deflected amplified wave has the same spatial qualities as the incident pilot wave.

The configurations described are compatible, of course, with any other angular deflection means of the incident beam, for example, an optomechanical and/or electrooptical device. Also, a bidimensional deflection of the beam is obtained by inserting a device of X-Y deflection, for example, two crossed acoustooptical cells, into the cavity.

We claim:

1. A power laser generator in which the direction of an output laser beam can be controlled comprising, successively on a single optical axis of propagation:
   a generator for generating a pilot laser beam of a predetermined wavelength;
   a deflector for deflecting said pilot laser beam based on a deflection control signal;
   a beam separator, wherein said pilot laser beam passes through said beam separator;
   an amplifying medium for amplifying said pilot laser beam; and
   a phase conjugation nonlinear mirror for reflecting said amplified pilot laser beam back into said amplifier to generate a further amplified laser beam, wherein said further amplified laser beam is thereby reflected by said beam separator.

2. A power laser generator according to claim 1, wherein said pilot laser generator delivers a low-power laser beam.

3. A power laser generator according to any one of claims 1 or 2, wherein said controllable deflector comprises an acoustooptical type deflector.

4. A power laser generator according to claim 3, wherein said acoustooptical deflector comprises a Bragg cell of $TeO_2$ or of $LiNbO_3$.

5. A power generator according to any one of claims 1 or 2, wherein said beam separator comprises a separator with polarization and a polarizer as a quarter-wave plate.

6. A power laser generator according to any one of claims 1 or 2, wherein said phase conjugation nonlinear mirror comprises a nonlinear medium.

7. A power laser generator according to claim 6, wherein said nonlinear medium consists of at least one of the following elements: methane gas ($CH_4$) or sulfur hexafluoride ($SF_6$), in which a stimulated Brillouin effect is developed, or gallum arsenide (GaAS) electro-optical crystals, in which the photorefractive effect is developed.

8. A power laser generator according to any one of claims 1 or 2, wherein said laser amplifying medium is a Slab type.

9. A power laser generator according to any one of claims 1 or 2, wherein said amplifying medium comprises:
a second part of a laser plate whose first part comprises the pilot laser generator, said laser plate being of a relatively large section and the amplification being obtained by a multipassage of the beam deflected in second part, the multipassage of beam being achieved by multiple reflections in mirrors, or total reflection prisms, outside of the laser plate.

10. A power laser generator according to one of claims 1 or 2, further comprising a focusing lens to couple an output face of the amplifying medium with the phase conjugation nonlinear mirror.

* * * * *